US005560549A

United States Patent [19]

Ricco et al.

[11] Patent Number: 5,560,549

[45] **Date of Patent: *Oct. 1, 1996**

[54] FUEL INJECTOR ELECTROMAGNETIC METERING VALVE

[75] Inventors: Mario Ricco; Giovanni Bruni, both of Bari, Italy

[73] Assignee: Elasis Sistema Ricerca Fiat Nel Mezzogiorno, Viale Impero, Italy

[ * ] Notice: The term of this patent shall not extend beyond the expiration date of Pat. No. 5,395,048.

[21] Appl. No.: 455,660

[22] Filed: May 31, 1995

Related U.S. Application Data

[63] Continuation of Ser. No. 174,113, Dec. 28, 1993, abandoned.

[30] Foreign Application Priority Data

Dec. 29, 1992 [IT] Italy .................................. TO92U0303

[51] Int. Cl.[6] .............................. B05B 1/30; F16K 31/40

[52] U.S. Cl. .................................... 239/533.8; 239/585.1; 251/129.16; 251/129.21

[58] Field of Search ......................... 251/129.16, 129.21; 239/533.8, 585.1

[56] References Cited

U.S. PATENT DOCUMENTS

| | | | |
|---|---|---|---|
| 3,464,627 | 9/1969 | Huber | 239/533.8 X |
| 3,610,529 | 10/1971 | Huber | 239/533.8 X |
| 4,795,098 | 1/1989 | Kirchner et al. | 251/129.16 X |
| 4,923,122 | 5/1990 | Morini et al. | 251/129.16 X |
| 4,928,888 | 5/1990 | Ricco | 239/533.8 |
| 4,946,106 | 8/1990 | Turchi et al. | 239/585.1 X |
| 5,054,691 | 10/1991 | Huang et al. | 251/129.16 X |
| 5,154,350 | 10/1992 | Ausiello et al. | 239/533.8 X |
| 5,169,066 | 12/1992 | Ricco et al. | 239/533.8 X |
| 5,238,224 | 8/1993 | Horsting | 251/129.16 |
| 5,246,165 | 9/1993 | De Matthaeis et al. | 239/533.8 X |
| 5,395,048 | 3/1995 | Ricco et al. | 239/533.8 X |

FOREIGN PATENT DOCUMENTS

| | | |
|---|---|---|
| 195261 | 3/1988 | European Pat. Off. . |
| 3741526 | 6/1989 | Germany . |

*Primary Examiner*—John Rivell
*Attorney, Agent, or Firm*—Ladas & Parry

[57] ABSTRACT

The valve comprises a shutter for the drain conduit of the control chamber of the injector; and an electromagnet having a fixed core with a seat for a coil which is energized to operate the armature controlling the shutter.

The core presents two coaxial annular pole pieces, the outer one of which is shorter than the inner one and fitted with a ring of magnetic material partially closing the seat and enabling a substantial reduction in the diameter and, hence, the hydraulic resistance and mass of the armature.

7 Claims, 1 Drawing Sheet

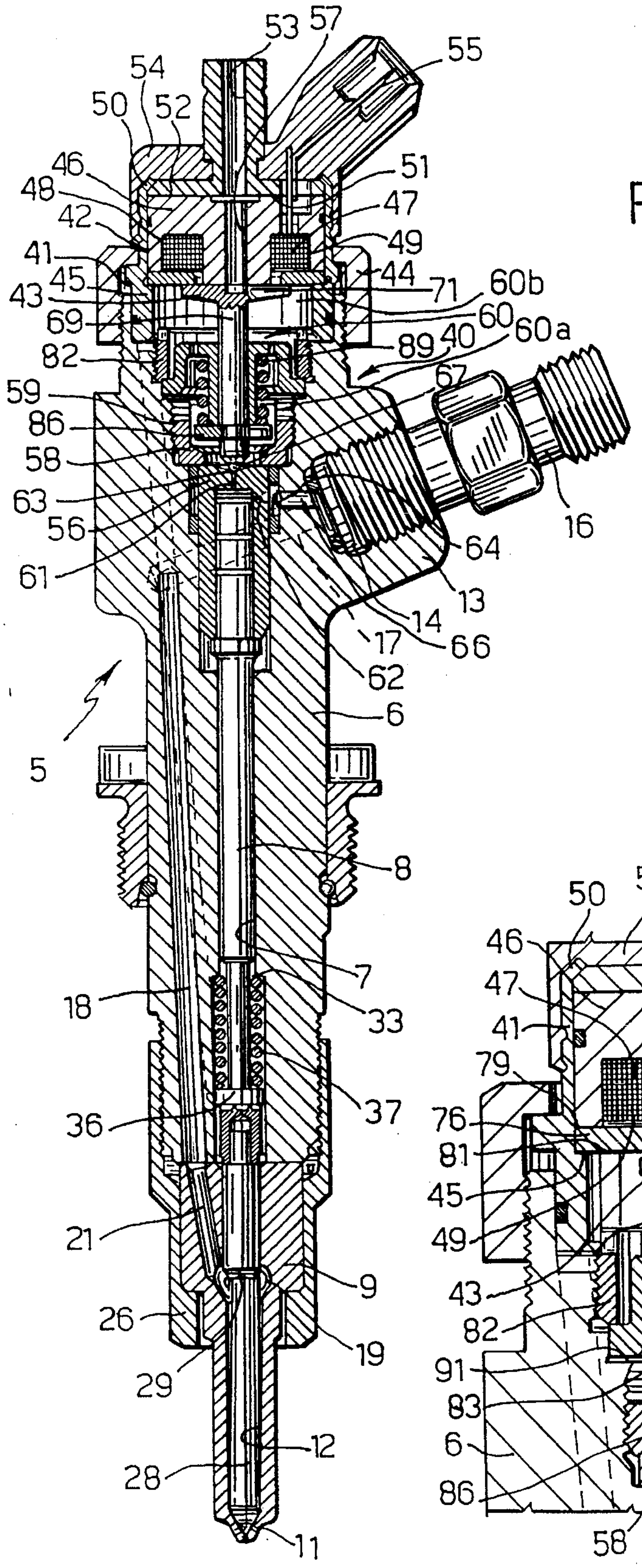
Fig.1
Fig.2
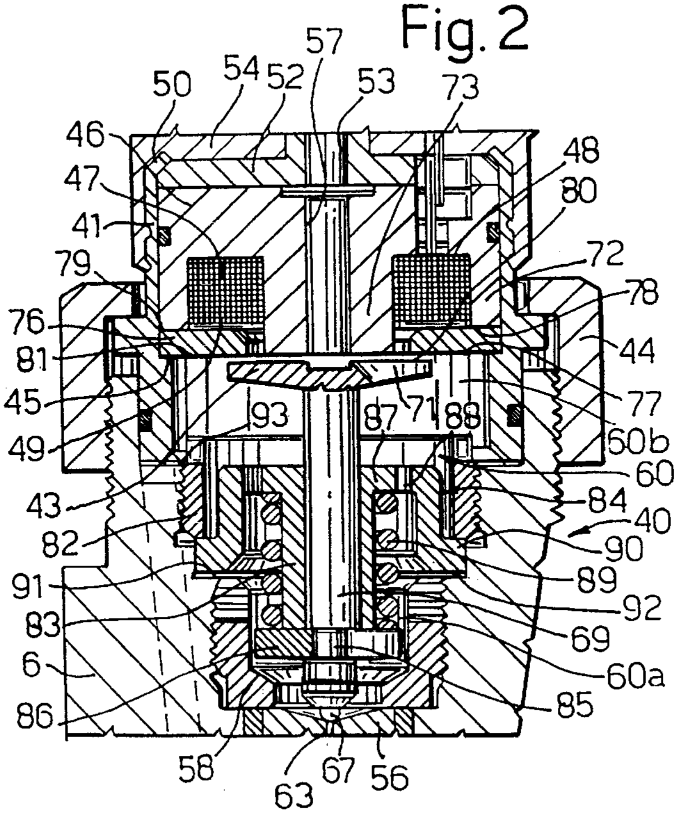

FUEL INJECTOR ELECTROMAGNETIC METERING VALVE

This is a continuation of application Ser. No. 08/174,113 filed on Dec. 28, 1993 now abandoned.

BACKGROUND OF THE INVENTION

The present invention relates to a fuel injector electromagnetic metering valve.

The metering valves of fuel injectors generally comprise a control chamber with a drain conduit normally closed by a shutter which, in known metering valves, is normally closed by the armature of an electromagnet, and is released to open the conduit by energizing the electromagnet so as to move the armature towards the core of the electromagnet.

As is known, the main parameter for evaluating the efficiency of a metering valve is the maximum permissible operating frequency, which depends on the speed with which the valve responds to a command to open or close the drain conduit, and hence on the speed with which it responds to energizing or de-energizing of the electromagnet.

The electromagnets of known metering valves generally present two coaxial pole pieces defining a seat for a cylindrical coil; while the armature is in the form of a disk for closing the magnetic circuit of the core, and which must therefore present a diameter substantially larger than the outside diameter of the core coil seat.

Metering valves of the aforementioned type present several drawbacks. In particular, the disk presents a large section resulting in considerable hydraulic resistance, parasitic currents, and a mass in turn resulting in considerable inertia; while, to achieve the necessary response, operation of the armature requires a strong return spring on the one hand and, on the other, an electromagnet capable of generating considerable electromagnetic force and, hence, having a large number of turns and/or a high energizing current.

SUMMARY OF THE INVENTION

It is an object of the present invention to provide a straightforward, highly reliable metering valve of the aforementioned type, designed to overcome the aforementioned drawbacks typically associated with known valves.

According to the present invention, there is provided a fuel injector electromagnetic metering valve comprising an electromagnet with a fixed magnetic circuit including a magnetic core; and a coil energizable so as to displace an armature controlling the metering function; said core comprising an annular seat for said coil; characterized by the fact that said magnetic circuit also comprises an element of magnetic material for partially closing said seat, so as to enable a substantial reduction in the size of said armature.

BRIEF DESCRIPTION OF THE DRAWINGS

A preferred, non-limiting embodiment of the present invention will be described by way of example with reference to the accompanying drawings, in which:

FIG. 1 shows a half section of a fuel injector featuring a metering valve in accordance with the present invention;

FIG. 2 shows a larger-scale section of a detail in FIG. 1.

DETAILED DESCRIPTION OF THE INVENTION

Number 5 in FIG. 1 indicates a fuel injector, e.g. for a Diesel internal combustion engine.

Injector 5 comprises a hollow body 6 having an axial cavity 7 in which slides a control rod 8. At the bottom, body 6 is connected to a nozzle 9 terminating with one or more injection orifices 11 communicating with an axial cavity 12.

Body 6 presents an appendix 13 having a hole 14 in which is inserted an inlet fitting 16 connected in known manner to a normal high-pressure, e.g. 1200 bar, fuel supply pump. Hole 14 communicates with a first inclined conduit 17 in turn communicating with a second conduit 18 substantially extending along body 6.

Nozzle 9 presents an injection chamber 19 communicating with cavity 12, and a conduit 21 connecting conduit 18 to chamber 19, and is fitted on to body 6 by means of a ring nut 26. Orifice 11 is normally closed by the tip of a pin 28 connected to rod 8 and having a shoulder 29 on which the pressurized fuel in chamber 19 acts. A compression spring 37 is fitted between a shoulder 33 of cavity 7 in body 6 and a plate 36, and which contributes towards pushing rod 8 downwards.

Injector 5 also comprises a metering valve 40 in turn comprising a sleeve 41 for supporting an electromagnet 42 controlling an armature 43. Sleeve 41 is fitted to body 6 by means of a further ring nut 44, and presents a shoulder 45 on which rests a core 46 of ferromagnetic, e.g. sintered powder, material. Core 46 presents a seat 48 in which is housed an electric coil 47 embedded in a resin 49.

Sleeve 41 also presents a bent edge 50 which provides for securing a disk 52 against a further flat surface 51 of core 46. Disk 52 forms one piece with a drain fitting 53 aligned with an axial hole 57 in core 46 and connected in known manner to the fuel tank; and sleeve 41 is fitted in known manner with a base 54 made of insulating material and fitted as usual with the pin 55 of coil 47.

Metering valve 40 also comprises a head 56 housed inside a seat in body 6, coaxial with cavity 7, and fitted to body 6 by a threaded ring nut 58 screwed on to the internal thread 59 of a drain chamber 60 inside body 6 and extending axially between the upper surface of head 56 and the lower surface of electromagnet 42.

Head 56 also presents an axial control chamber 61 communicating with a calibrated radial inlet conduit 62, and with a calibrated axial drain conduit 63. Inlet conduit 62 communicates with a receiving chamber 64 in turn communicating with hole 14 via a radial conduit 66 in body 6. Control chamber 61 is defined at the bottom by the upper surface of rod 8.

By virtue of the larger area of the upper surface of rod 8 as compared with that of shoulder 29, the pressure of the fuel, together with spring 37, normally keeps rod 8 in such a position as to close orifice 11 of nozzle 9. Drain conduit 63 of control chamber 61 is normally closed by a shutter in the form of a ball 67 on which a stem 69 integral with armature 43 acts; and armature 43 presents radial openings 71 for connecting drain chamber 60 to hole 57 in core 46 and consequently to drain fitting 53.

Core 46 is externally cylindrical, and presents two coaxial annular pole pieces 72, 73 (FIG. 2) forming seat 48 of coil 47; and armature 43 is disk-shaped for closing the magnetic circuit, including core 46, between pole pieces 72 and 73. According to the present invention, the magnetic circuit comprises an element 76 of magnetic material, for partially closing seat 48. More specifically, element 76 is in the form of a ring having two flat parallel surfaces 77, 78, an outside diameter substantially equal to that of core 46, and an inside diameter slightly larger than the outside diameter of inner pole piece 73.

Pole pieces 72, 73 present two parallel pole surfaces 79, 80 so that the length of the outer pole piece 72 is less than that of inner pole piece 73, and the difference between the two lengths is substantially equal to the thickness of ring 76 between surfaces 77 and 78. Ring 76 is fitted to outer pole piece 72 with surface 78 contacting pole surface 79. Pole surfaces 79 and 80 may present a layer 81 of nonmagnetic material for preventing the upper surface of armature 43 from directly contacting pole surfaces 79, 80.

Surface 77 of ring 76 thus lies in the same plane as surface 80 of pole piece 73, but the distance between pole piece 73 and ring 76 is much smaller than the width of seat 48 of coil 47, so that the diameter of armature 43 may be reduced enormously as compared with that required for closing the magnetic circuit on pole piece 72. For example, the diameter of armature 43 may be so selected that the portion facing surface 77 of ring 76 presents substantially the same area as the portion facing pole piece 73.

As a result, the mass of armature 43 is greatly reduced, thus reducing the force required for operating it in either direction; and seat 48 may be enlarged as compared with known techniques, for housing a larger number of turns of coil 47 and so reducing the operating current required. Moreover, seat 48 enables the turns of coil 47 to be coated or embedded in a larger quantity or thickness of resin 49, thus enhancing the protection and extending the working life of coil 47.

The small diameter of armature 43 also permits the passage of a ring nut 82 with a larger inside diameter than armature 43. More specifically stem 69 is guided by a sleeve 83 fitted to a plate-shaped element 84, and presents a groove 85 in which is inserted a C-shaped washer 86.

Plate 84 presents an end wall 87 with holes 88 enabling communication between the portions of chamber 60 above **60*b* and below 60*a* plate 84; and, between end wall 87 and washer 86, there is provided a preloaded compression spring 89 which acts as a return spring for drawing armature 43 downwards when electromagnet 42** is de-energized.

Plate 84 presents a flange 90 which, by means of a calibrated washer 91, rests on a shoulder 92 of body 6. The assembly consisting of armature 43, spring 89 and plate 84 is fitted inside body 6 by means of threaded ring nut 82, which is screwed inside a threaded seat 93 in body 6.

Injector 5 as described above operates as follows.

Electromagnet 42 is normally de-energized, so that armature 43 is held by return spring 89 in the down position in the accompanying drawings; stem 69 keeps ball 67 in the position closing drain conduit 63; and the pressure generated in control chamber 61 acts on the upper surface of rod 8 having a greater surface area than shoulder 29, and, together with the action of spring 37 (FIG. 1), overcomes the pressure on shoulder 29 so that rod 8 is held down together with pin 28 which closes orifice 11.

When electromagnet 42 is energized, armature 43 is raised and arrested with its upper surface on layer 81 (FIG. 2) of the magnetic circuit. Alternatively, calibrated washer 91 may be so selected that armature 43 is arrested with washer 86 against the edge of sleeve 83, thus preventing armature 43 from contacting pole surfaces 79, 80, and enabling layer 81 on core 46 to be dispensed with.

The residual pressure of the fuel in chamber 61 therefore opens metering valve 40 so as to discharge the fuel through calibrated hole 63 into drain chamber **60*a*, and through holes 88 into drain chamber 60*b*, from where it is fed through openings 71, hole 57 and conduit 53 back into the tank. The pressure of the fuel in injection chamber 19 now overcomes the force exerted by spring 37 and raises pin 28 which opens orifice 11 so as to inject the fuel in chamber 19**.

When electromagnet 42 is de-energized, armature 43 is restored rapidly to the down position by spring 89, so as to close drain conduit 63 by means of ball 67; and the pressurized incoming fuel from conduit 62 restores the pressure inside control chamber 61 so as to lower pin 28 and close orifice 11. In this condition,the upper surface of armature 43 is spaced (see FIG. 2) from surface 77 and surface 80 or layer 81.

The advantages of the metering valve according to the present invention will be clear from the foregoing description. In particular, ring 76 provides for reducing the diameter of armature 43, thus reducing the mass of the armature, hydrodynamic resistance, and the parasitic currents induced by coil 47, which in turn provides for reducing the size of return spring 89, core 46 and, hence, electromagnet 42 as a whole, so that the entire control assembly of injector 5 may be miniaturized.

Finally, for a given size of core 46, the width of seat 48 may be increased for embedding coil 47 in a greater quantity of resin 49.

To those skilled in the art it will be clear that changes may be made to the metering valve as described and illustrated herein without, however, departing from the scope of the present invention. For example, ring 76 may present a depression for receiving pole piece 72; and armature 43 may present an upper surface divided by a step into two separate parts respectively facing ring 76 and pole piece 73.

Moreover, plate 84 may be eliminated; stem 69 need not necessarily present washer 86, and may be guided differently; return spring 89 may be positioned differently; and stem 69 may be mounted in sliding manner in relation to armature 43.

We claim:

1. A fuel injector metering valve comprising an electromagnet including a one-piece magnetic core, said core including inner and outer coaxial pole pieces defining a seat therebetween, a coil in said seat coaxial with said pole pieces, said inner pole piece including a portion extending beyond the outer pole piece and said coil, a ring encircling said portion and contacting said outer pole piece, said ring and outer pole piece having an at least substantially common outer diameter, said ring and inner pole piece having surfaces facing away from said coil, said surfaces being in at least substantially coplanar relation, an armature displaceable between a position in engagement with said surfaces and positions spaced therefrom, a stem on said armature in coaxial relation with said pole pieces and displaceable with said armature, closure means on said stem, resilient means on said stem and normally urging said stem in a direction so that said armature is separated from said surfaces, means defining an opening adapted for being obturated by said closure means responsive to the position of said stem, a body defining a cavity coupled to said opening, a rod in said cavity adapted for being displaced by fuel passing into said cavity, a pin, nozzle means supporting said pin on said body in position for engagement by said rod and defining an orifice adapted for being selectively opened and closed by said pin, and a source of fuel, said nozzle means and body defining conduits coupled to said source for the supply of fuel to said opening and orifice from said source.

2. A metering valve as claimed in claim 1, comprising means defining a chamber bounded in part by said ring and in which said armature is displaceable, said chamber being coupled to said opening, said core being provided with a hole adapted for being connected with said chamber, said armature being provided with at least one opening by which said chamber is coupled to said hole for drainage.

3. A metering valve as claimed in claim 2, wherein said body is provided with a further conduit coupled to the first said conduit, comprising a fitting coupled to said further conduit and adapted for connection to a fuel supply pump, said body being provided with a calibrated hole connecting said further conduit to said cavity.

4. A metering valve as claimed in claim 3, comprising means in said chamber dividing said chamber into separate axially spaced sections and providing a seat for said resilient means and provided with holes connecting the spaced sections of said chamber.

5. A metering valve as claimed in claim 1, comprising a spring engaging said rod and adapted to yieldingly resist the force of the fuel acting on said rod; said further conduit connecting said fitting to said cavity in said body whereby the fuel can act on said rod and pin to selectively close said orifice.

6. A metering valve as claimed in claim 1, wherein said pin and rod respectively have a shoulder and a surface upon which the fuel exerts a pressure, said shoulder and surface being of such relative areas that the pin normally maintains the orifice closed.

7. A metering valve as claimed in claim 4, wherein said electromagnet is adapted to exert a force which can overcome said resilient means and displace said armature to couple said fitting via said outlet, chamber and opening in said armature to said hole for drainage.

* * * * *